United States Patent [19]

Katerberg et al.

[11] Patent Number: 4,999,644

[45] Date of Patent: Mar. 12, 1991

[54] USER SELECTABLE DROP CHARGE SYNCHRONIZATION FOR TRAVELING WAVE-STIMULATED, CONTINUOUS INK JET PRINTERS

[75] Inventors: James A. Katerberg, Kettering; David N. Pipkorn, Centerville, both of Ohio

[73] Assignee: Eastman Kodak Company, Rochester, N.Y.

[21] Appl. No.: 451,851

[22] Filed: Dec. 18, 1989

[51] Int. Cl.[5] .................... G01D 15/18

[52] U.S. Cl. .................... 346/1.1; 346/75

[58] Field of Search .................... 346/1.1, 75

[56] References Cited

U.S. PATENT DOCUMENTS 4,510,503 4/1985 Paranjpe et al. .................... 346/75

4,616,234 10/1986 Wint .................... 346/75

*Primary Examiner*—Bruce A. Reynolds

*Assistant Examiner*—Gerald E. Preston

*Attorney, Agent, or Firm*—John D. Husser

[57] ABSTRACT

A system for selectively shifting the phase of drop charging along the array of ink jets of a continuous ink jet printer by producing a replicate signal of the drop stimulation signal; selectively shifting the phase of the replicate signal to provide a phase control signal; synchronizing a media feed tachometer signal to the phase control signal to produce a print enable signal; and controlling address of the charge electrodes with the print enable signal. The system further includes a selection mode wherein drop charge phase can be made random by selecting synchronization with the media feed tachometer signal.

6 Claims, 5 Drawing Sheets

FIG. 1
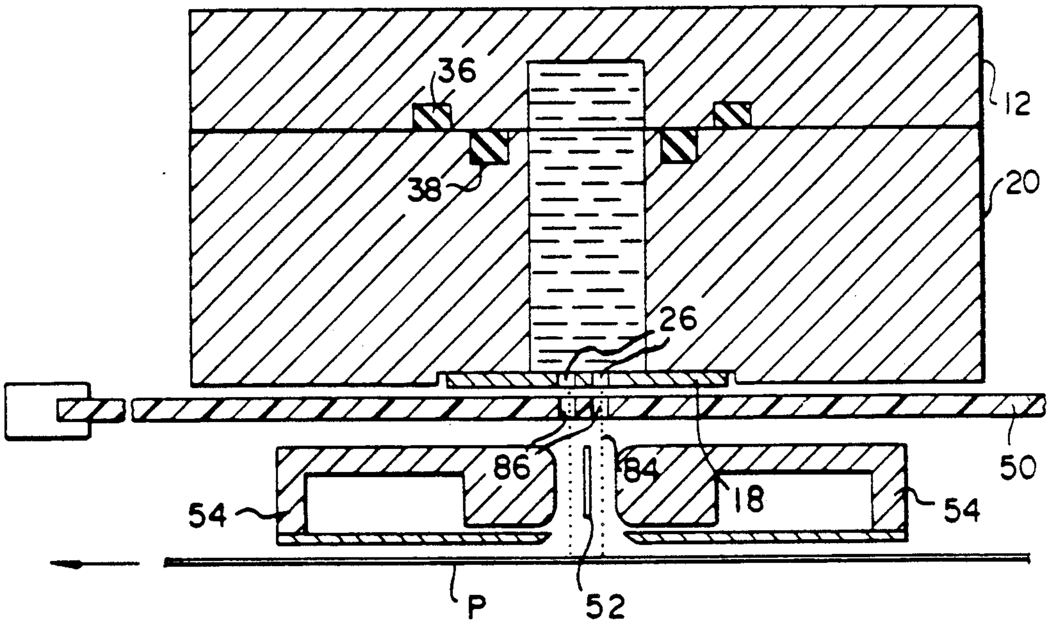
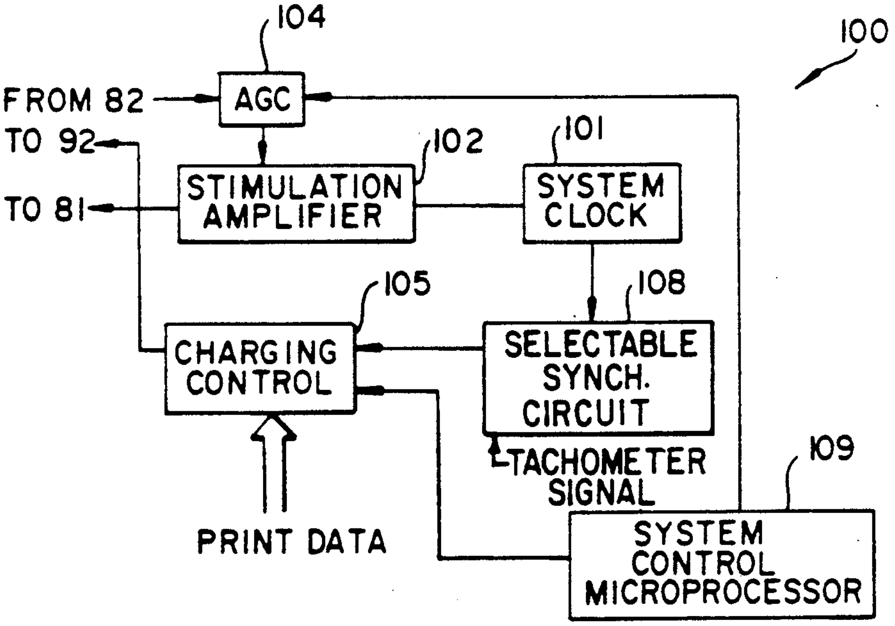
FIG. 3

USER SELECTABLE DROP CHARGE SYNCHRONIZATION FOR TRAVELING WAVE-STIMULATED, CONTINUOUS INK JET PRINTERS

FIELD OF INVENTION

The present invention relates to continuous ink jet printers of the kind employing traveling wave stimulation of the orifice plate and more specifically to improved systems for snychronizing drop charging in such printers.

BACKGROUD ART

In the binary form of continuous ink jet printing ink is directed, under pressure, through an array of orifices (formed in an orifice plate) to produce a plurality of ink jet filaments directed toward a print zone. The orifice plate is stimulated (e.g. by vibration) to regulate the break-up of the filaments into droplet streams. The stimulation ensures that each of the drops formed from a given filament break off at essentially the same phase relative to the plate vibration or stimulation source. While some stimulation means, such as described in U.S. Pat. No. 4,683,477, are intended to produce substantially the same break off phase for all jets in the array, the break off phase varies significantly from jet to jet with traveling wave stimulation such as described in U.S. Pat. No. 3,739,393.

Drop charge electrodes are located adjacent the drop break-off regions of respective filaments, and when energized with a voltage, induce a charge of opposite polarity on the drops that are then breaking off the filament ends. The energization of drop charge electrodes is controlled by cyclic gating of groups of "on" or "off" information signals to electrode drivers. Typically, charged drops are deflected to a catcher device and uncharged drops pass on to the print surface.

The charge electrode driving electronics is designed for a normally biased condition, i. e. normally catch drop producing. To produce a print drop on the charge electrode, voltage must be dropped to near zero volt for an interval which includes the drop break off. For drop generators, such as described in U.S. Pat. No. 4,683,477, which produce substantially uniform drop break off phases for all jets in the array, the print pluses are applied (as needed) at a common phase relative to the stimulation source. By properly phasing the print pulse, using one of many procedures for determining the proper phase, drops from all the jets in the array can be properly controlled.

Drop generators employing traveling wave stimulation produce drop break-offs at essentially all phase angles relative to the stimulation source. Print pulses which are at constant phase relative to the stimulation source are likely to produce bands of print defects parallel to paper motion. The bands of defects correspond to drops breaking off with phases outside the print pulse or with phases corresponding to the transient leading and trailing edges of the print pulse. While the print pulse width can be increased to 360° wide to ensure that no jets have drop break off outside the print pulse, there is always a possibility of jets with drops breaking off during the pulse transients. Even though the charging voltage is changing very rapidly from a catch charge level to a print charge level during the transient, drops with break off during the transient are charged in various amounts from near zero charge, (corresponding to the print drops) up to the charge of the catch drops. The partially charged drops may be caught if the drop charge is high, or they may strike the print media as an improperly deflected print drop.

Thus, a problem with prior art traveling wave stimulation printrs (which their non-synchronous drop break-off) is that they have several jets along the array with drops breaking-off in the switching interval. Rather than try to eliminate switching period drop errors, the prior art printers have used designs which randomize these errors. For example, by clocking the phase of the address cycles only from a print medium tachometer signal, with no reference to the phase of traveling wave stimulation, there is produced a randomization of the location of the switching period drop defects. By randomizing the defect locations, defects may be less objectional than if located in one or more bands across the print.

While helpful to some extent, the prior art randomizing approach still results in many stray dots on the print medium. Also, the number of drops per pixel printed will not be uniform. This produces banding in large area prints, especially half tones, as well as dot size variation in printed dot matrix characters.

SUMMARY OF THE INVENTION

The object of the present invention is to provide for continuous ink jet printers that employ traveling wave stimulation, a drop-charge approach that avoids the problems of prior art devices and substantially reduces the defects on output print medium. Thus, one advantage of the present invention is that printing can be effected selectively to avoid observable print defects incident to the uncontrolled printing of switching period drops.

The present invention constitutes improvements for ink jet printers of the kind which are adapted to print on successive line regions of a print media during respective line print periods and which include: (i) an orifice plate comprising an orifice array for producing a plurality of ink jets, (ii) stimulation means for imparting traveling wave vibration along the length of the orifice plate, and (iii) a plurality of selectively addressable charge electrodes located along the drop break-off region of such ink jets. In one aspect the invention provides an improved drop charge control system for shifting switching errors to non printing ink streams and comprises:

(a) a tachometer circuit for providing a first pulse train signal having a frequency indicative of the movement of print medium past the orifice array;

(b) a clock for providing a second pulse train signal which has a fixed phase relationship to the stimulation means;

(c) a circuit for selectively phase shifting said second pulse train signal;

(d) a circuit for receiving said first pulse train signal and said second pulse train signal, as shifted, and producing a third pulse train signal which comprises pulses having a fixed phase relative to said second pulse train signal, as shifted, and a frequency equal to the pulses of said first pulse train signal;

(e) gate means, for producing print pulses to said charge electrodes, in accord with information signals and in synchronization with said thir pulse train signal.

In one preferred embodiment a selection switch is provided to allow operators to couple the print pulse gate means either to the third pulse train signal for the first pulse train signal.

BRIEF DESCRIPTION OF DRAWINGS

The subsequent description of preferred embodiments refers to the accompanying drawings wherein:

FIG. 1 is a cross-sectional view of one continuous ink jet printing system which can utilize the present invention;

FIG. 3 is a diagram of the control circuit for the FIG. 1 printer system;

DETAILED DESCRIPTION OF PREFERRED EMBODIMENTS

Figure 2:
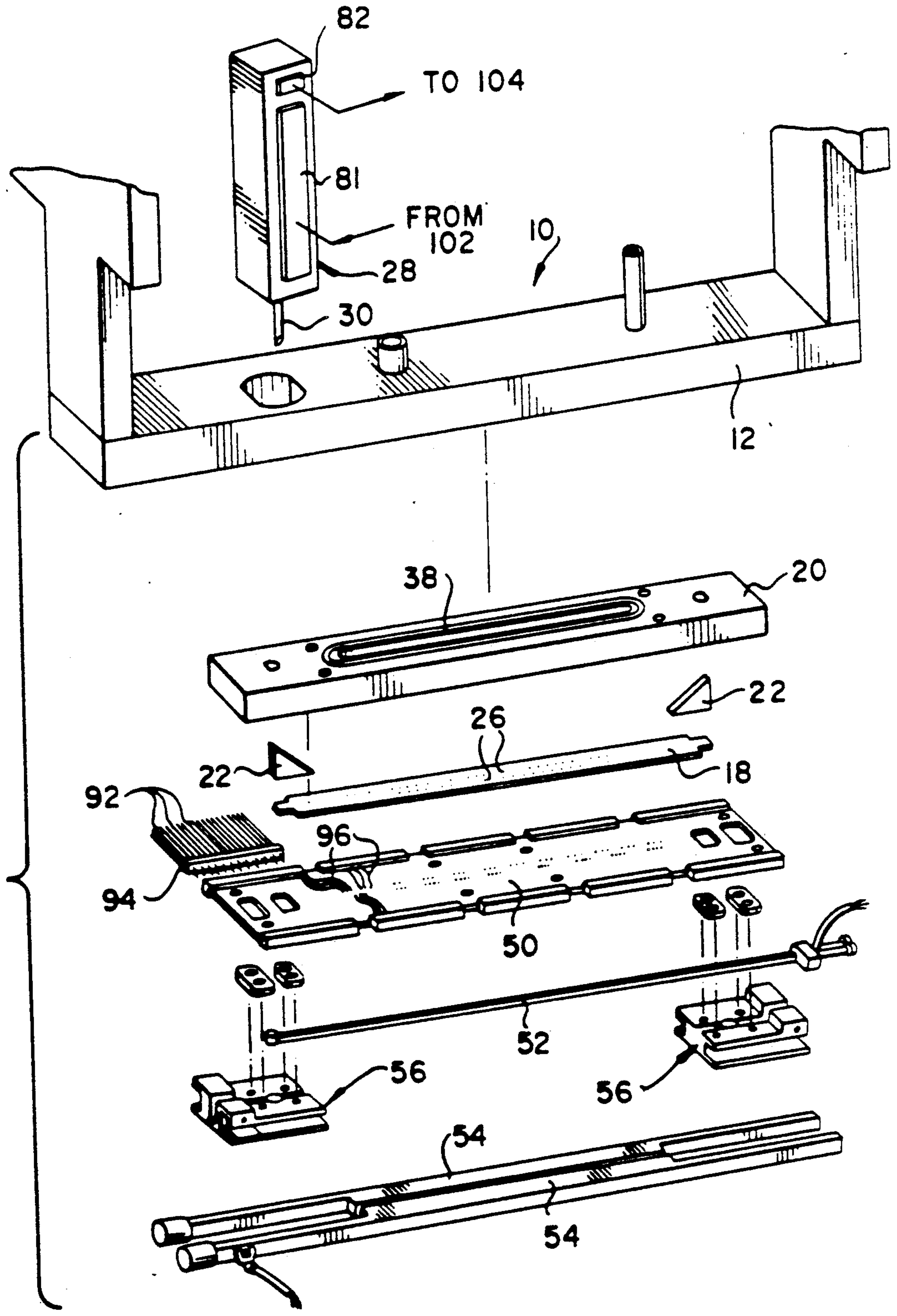
FIG. 2 is an exploded perspective view of the FIG. 1 printer assembly.

The ink jet printer system shown in FIG. 1 is of the continuous type and employs traveling wave drop stimulation. With reference to FIGS. 1 and 2 it will be seen that the various elements of a print head assembly 10 are assembled by attachment to a support bar 12.

The assembly comprises an orifice plate 18 bonded to fluid supply manifold 20 with a pair of wedge-shaped acoustical dampers 22 at the ends of the orifice plate. Orifice plate 18 contains two rows of orifices 26 and is preferably stimulated by a stimulator 28 which is mounted into support bar 12 and includes a stimulation probe 30 that extends through the manifold 20 and into direct contact with one end or orifice plate 18. The stimulator 28 includes piezoelectric transducers 81 and 82 to create and monitor the probe vibration. Orifice plate 18, manifold 20, support bar 12 together with O-rings 36 and 38 comprise a clean package which may be preassembled.

Other major elements of the print head are a charge ring plate 50, an electrically conductive deflection ribbon 52, clamping assemblies 56 and a pair of cathers 54. The fully assembled recording head is shown in cross section in FIG. 1. As illustrated, ink I flows downwardly through the manifold 20 and is ejected through orifices 26, forming two rows of streams which break up into two curtains of drops 84. Drops 84 then pass through two rows of charge rings 86 in charge ring plate 50 and thence into one of the catchers 54 or onto the moving web of paper P.

Formation of drops 84 is closely controlled by application of constant frequency, controlled amplitude, stimulating distrubance to each of the fluid streams emanating from orifice plate 18. Disturbances for this purpose may be set up by operating transducer 28 to vibrate probe 30 at constant amplitude and frequency against plate 18. This causes a continuing series of bending waves to travel the length of the orifice plate, each wave producing drop stimulating distrubances each time it passes one of the orifices 26. Dampers 22 prevent reflection and repropagation of these waves.

As each drop 84 is formed it is exposed to the charging influence of one of the charge rings 86. If the drop is to be deflected and caught, an electrical charge is present on the associated charge ring 86 for a time interval including the instant of drop formation. This causes an electrical charge to be induced in the tip of the fluid filament and carried away by the drop. As the drop traverses the deflecting field set up between ribbon 52 and the face of the adjacent catcher, it is deflected to strike and run down the face of the catcher, where it is ingested, and carried off. Drop ingestion may be promoted by application of a suitable vacuum to the ends of catchers 54.

The printer control system 100, in general, includes a system clock circuit 101 and a stimulation amplifier circuit 102, which cooperate with automatic gain control circuit 104 and microprocessor 109 to regulate stimulation amplitude and phase. System 100 also includes a chargig control circuit 105 which cooperates with selectable synchronization circuit 108 and microprocessor 109 to effect energization of electrodes 86 in accord with received print data and in proper timed relation with stimulation and print media feed, according to the present invention.

As noted above, in traveling wave stimulation the orifice plate, which is secured at all its edges to a rigid holder, is caused to vibrate by stimulation transducer pin 30. This orifice plate vibration, which is initiated off one end of the jet array, propagates as a wave down the orifice plate; FIG. 1. The orifice plate, with its boundaries defined by its mount to the holders, serves as a waveguide for the propagation of the flexure wave down the jet array. The finite propagation speed down the array produces a phase shift in the drop break off from jet to jet. (The propagation speed is a function of orifice plate thickness, width, and material). Attenuation of the flexure wave causes the vibration amplitude of the last jets to be lower than that of the first jet. This vibration amplitude difference results in a change in break off length and, therefore, in an additional break off phase shift across the array.

Figure 4:
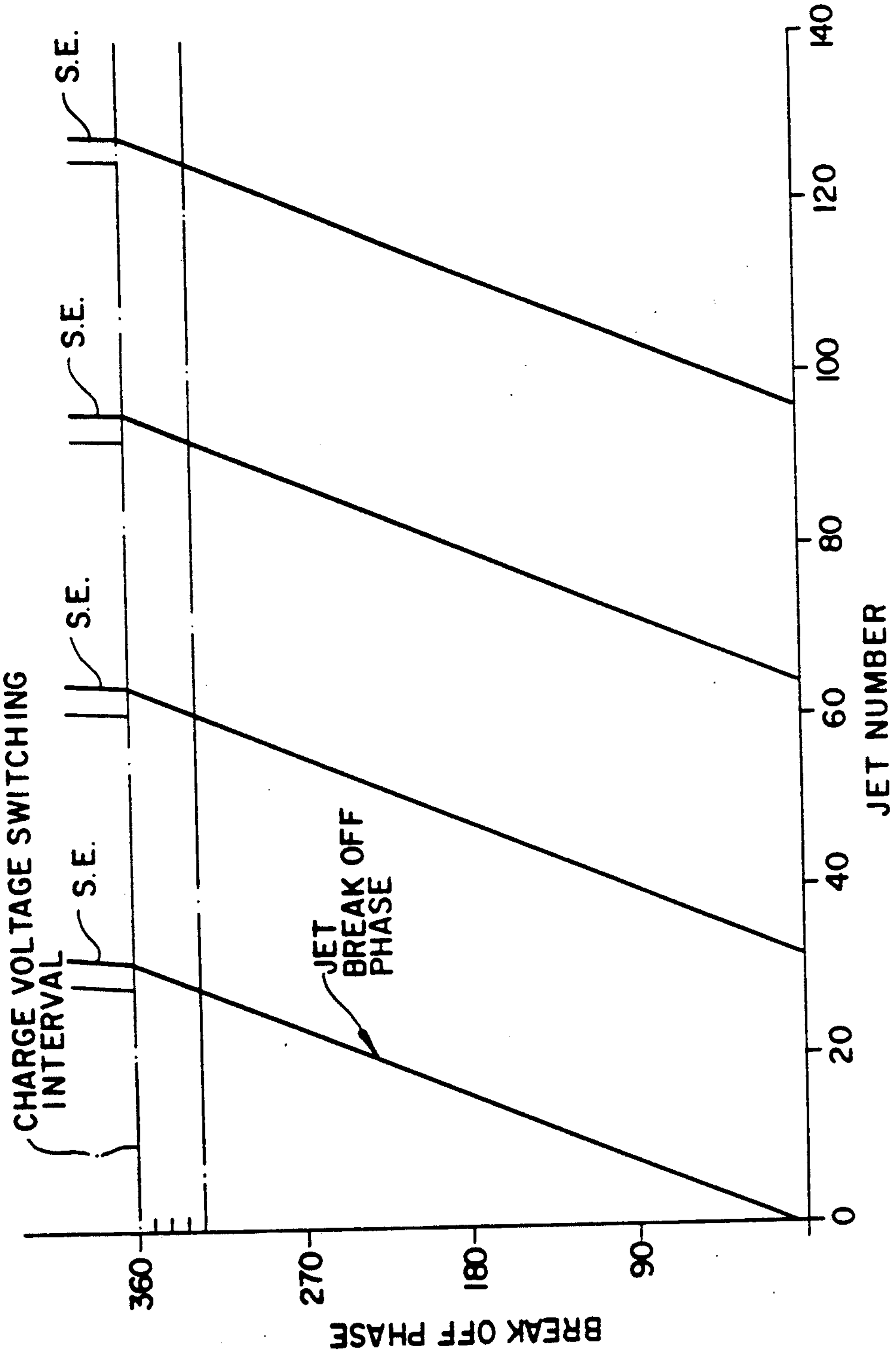
FIG. 4 is a diagram useful in explaining the problem with which the present invention deals.

FIG. 4 is a diagram showing the phases of drop break-off for the different ink jet streams of one preferred embodiment of ink jet printer having an orifice plate comprised of a linear array of 128 orifices. As indicated in FIG. 4, such a traveling wave print head produces several "switching error" regions (denoted S.E.) across the array. In these switching error regions drops are improperly charged because break-off occurs during the charge voltage switching interval. The synchronizing of print pulses to stimulation causes the switching errors to to be fixed at particular spaced groups of jets, shown by regions S.E. in FIG. 4. When the system is adjusted so that jets within the switching error regions S.E. are never required to provide printing drops, there will be no print defect on paper due to switching transients. This is the approach according to one aspect of the present invention.

Figure 5:
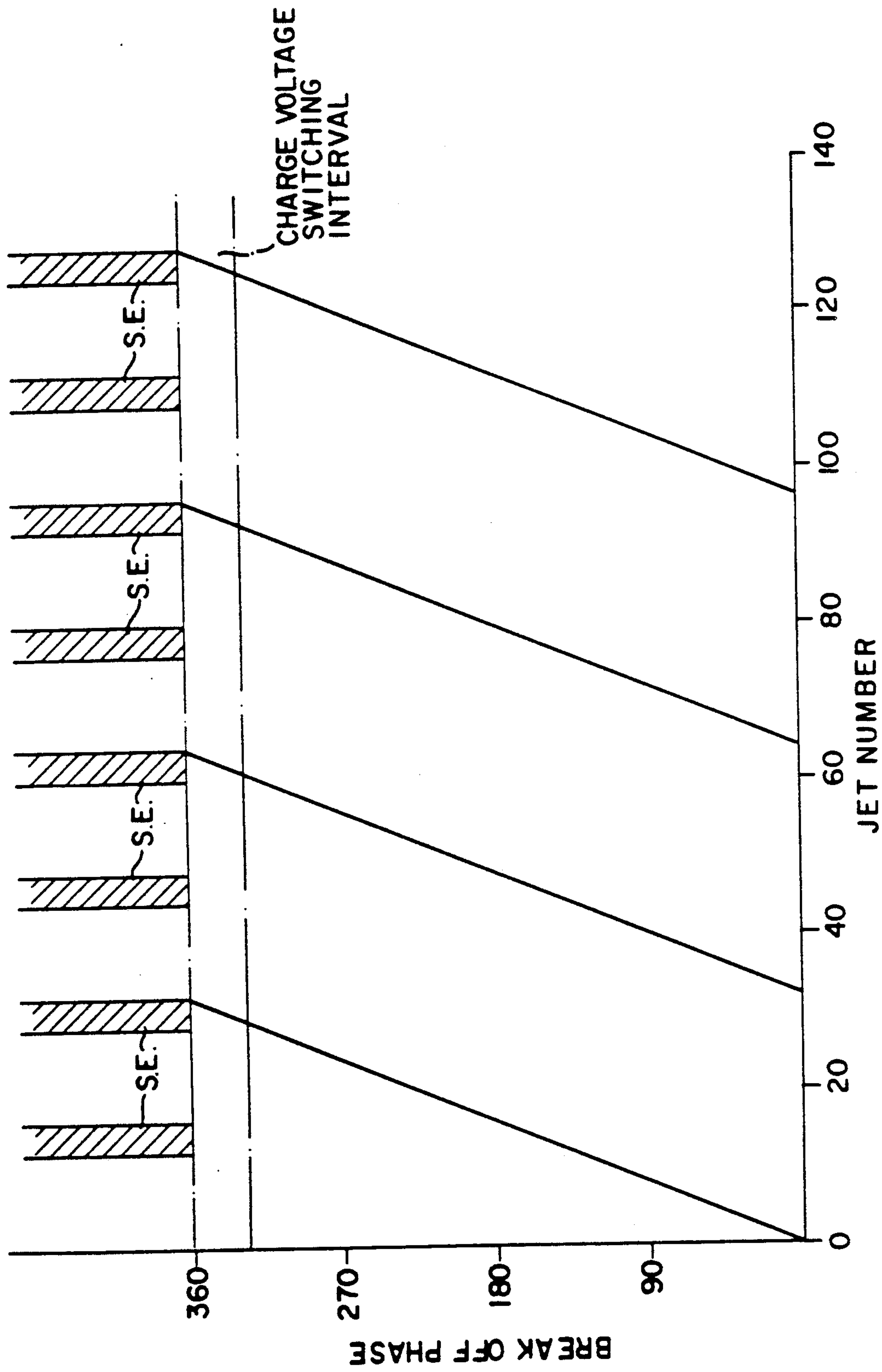
FIG. 5 is a diagram useful in explaining the approach of one embodiment of the present invention.

FIG. 5 illustrates that with the most popular font it is, in many cases, possible to set the print pulse phase so that the switching errors are located between the lines of print. In such a mode the regions S.E. are never required to print and therefore no defects are seen. That is, with the print pulse phase synchronized to a charge phase control pulse train of frequency equal to the stimulation frequency, the control pulse train can be shifted in phase to locate the switching errors at non-printing jets. Since the electrodes for non-printing jets are continuously energized at a catch voltage and receive no print signals that would reduce the voltage to zero, there are no transient voltages that can cause stray drops to print.

In typical print heads there are about 32 jets between switching error regions (360° delay/32 jets). The popular 9×12 font spaces lines of text 16 jets apart, but only prints with 12 of the 16 jets. By adjusting the phase of the charge phase control pulse train, derived from the stimulation signal, to locate the switching errors on the 4 unused jets per line, all the visible print defects due to the print pulse switching can be eliminated. Should the print job preclude the elimination of these print defects, perhaps because all jets are printed, or the line spacing and phase delay rates down the bar do not match, the operator can select to print in the asynchronous mode, to randomize the errors. In addition to the use described, the ability to shift the print defects along the ink jet stream array can be used to aid the operator in determining the nature of a print defect, i.e., whether it is due to switching or a crooked jet.

Figure 6:
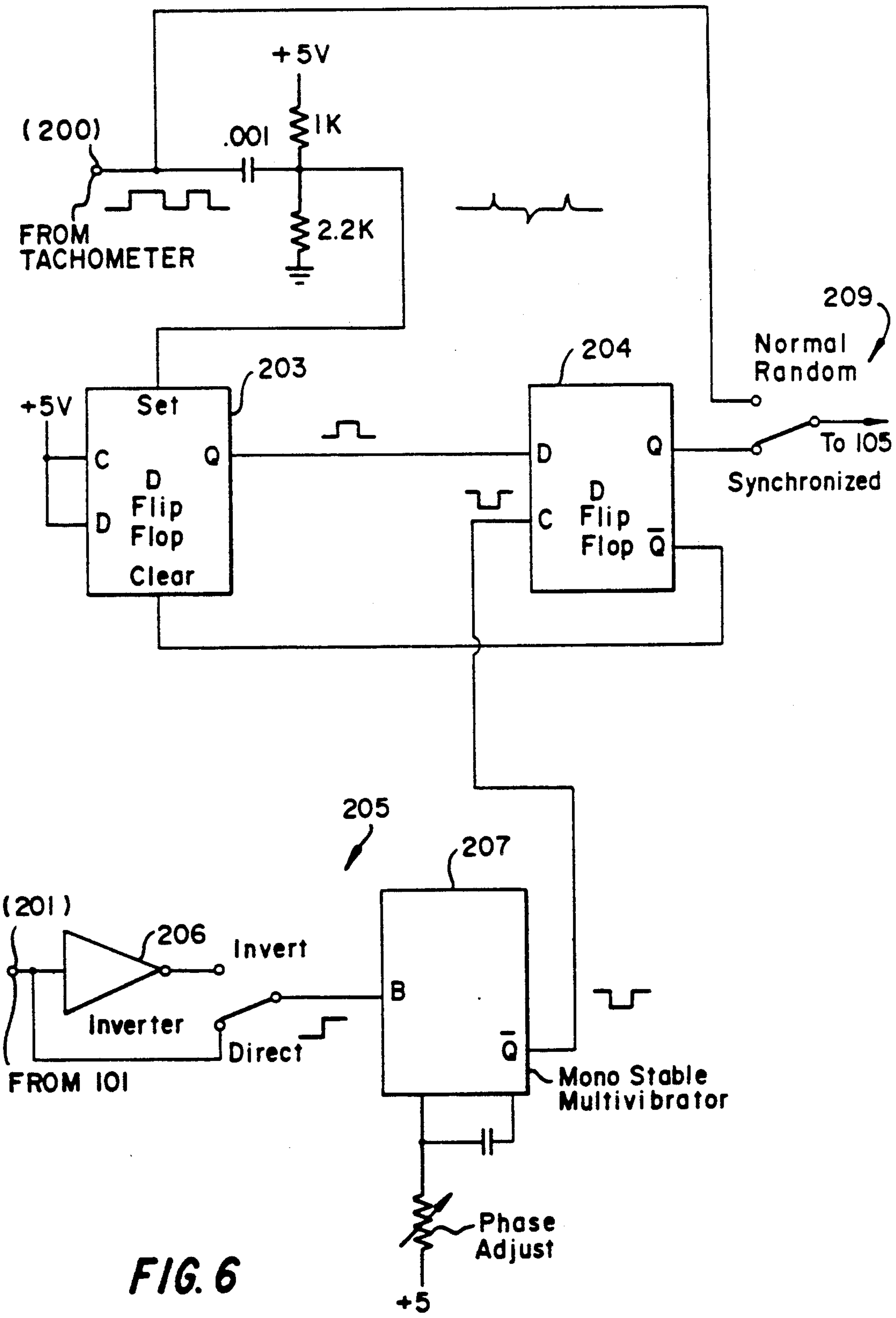
FIG. 6 is a circuit diagram of one preferred embodiment for drop charge control in accord with the present invention.

A circuit used to provide user selectable synchronization, in accord with the present invention, is illustrated in FIG. 6. To understand this circuit, it is necessary to review a method used in conventional traveling wave printers to time the print pulses. Such conventional printers normally generate a print pulse at a fixed time interval after receiving a tachometer pulse. As the normal tachometer signal is not phase locked to the stimulation signal, the resulting print pulses are randomly phased to the stimulation signal. In one option, the circuit illustrated in FIG. 6 effectively produces tachometer signals which are phase locked to the stimulation signal.

In the FIG. 6 selectable snychronization circuit, the tachometer signal, applied at the circuit input 200, is slow compared to the stimulation clock signal, applied at the circuit input 201, and is used to set a first D-type flip-flop 203. The replicate stimulation signals (corresponding to those applied to circuit 102) are applied to a phase adjustment circuit 205. The output of phase adjustment cirucit 205 is applied to a second D-type flip-flop 204 and the next following phase adjusted, stimulation clock pulse (after the setting of first flip-flop 203) causes the second flip-flop 204 to have a high output at Q. This provides a tachometer signal synchronized to the stimulation clock signal as phase adjusted by circuit 205. Concurrently, the Q output goes low on the second flip-flop 204 which clears the first flip-flop 203. The next phase adjusted stimulation clock signal causes the tachometer signal output to go low again. The circuit is now ready for the next tachometer signal.

The inverter 206 and the monostable multivibrator 207 of phase adjustment circuit 205 provide the means to shift the phase of the charge control pulses, which enable printing actuation of the charge electrodes. The monostable multivibrator 207 is designed to produce a phase adjustment range of more than180° and less than 360°. Combined wit a 180° phase shift in the inverter 206, two overlapping ranges of phase variation are produced, which allow phase adjustment over the 360° interval required. The operator can make this adjustment while examining print samples to align the switching error bands (S.E.) between the print lines. Various automated phase setting means can also be incorporated.

By means of the a selection switch 209, the operator can choose the randomly phased print pulse directly from the tachometer signal or the phase-locked print pulse just described. The control system of the present invention can be used either in the form of an external plug-in embodiment, or can be built into the printer.

The invention has been described in detail with particular reference to preferred embodiments thereof, but it will be understood that variations and modifications can be effected within the spirit and scope of the invention. For example, phase adjustment circuit 205 of FIG. 6 could be embodied at the output Q of flip flop 204. In such embodiment, the stimulation clock signal from clock 101 would be coupled directly to the C input of flip flop 204.

We claim:

1. In a continuous ink jet printer of the kind having: (i) an orifice plate comprising a linear orifice array for producing a plurality of ink jets, (ii) stimulation means for imparting traveling wave vibration along the length of said orifice plate, and (iii) a plurality of selectively addressable charge electrodes located adjacent the drop break-off region of such ink jets, an improved control system for selectively shifting the location of drop charge defect incident to switching error, said system comprising:

(a) tachometer circuit means for providing a first pulse train signal having a frequency indicative of the movement of print medium past such ink jets;
(b) clock means for providing a second pulse train signal which has a fixed phase relationship to said stimulation;
(c) means for selectively phase shifting said second pulse train signal to form a phase control pulse train signal;
(d) means for receiving said first pulse train signal and said phase control pulse train signal and producing a third pulse train signal which comprises pulses having a fixed phase relative to said phase control pulse train signal, and a frequency equal to the pulses of said first pulse train signal; and
(e) gate means, for producing print pulses to said charge electrodes, in accord with information signals and in synchronization with said third pulse train signal.

2. The invention defined in claim 1 further comprising mode switch means for selectively coupling said gate means to either said first pulse train signal or said third pulse train signal.

3. In a continuous ink jet printer of the kind adapted to print on successive line regions of a print media at a print zone and having: (i) an orifice plate comprising an orifice array for producing a plurality of ink jets, (ii) stimulation means for imparting traveling wave vibration along the length of said orifice plate, and (iii) a plurality of selectively addressable charge electrodes located adjacent the drop break-off region of such ink jets, an improved drop charge control system comprising:

(a) first circuit means for producing a first signal having a frequency representing the velocity of print medium movement past said print zone;
(b) clock means for providing a stimulation signal to said stimulation means;
(c) phase shifting means for receiving, and selectively phase adjusting, a replicate stimulation signal from said clock means to provide a phase control signal;
(d) charge synchronization means for combining said first signal and said phase control signal and outputting a switch enable signal pulse train having the phase of said pulse control signal and said first pulse train frequency; and
(e) charge control cirucit means for controlling energization of said electrodes in accord with information signals and with switch enable signals from said charge synchronization means.

4. A method for selectively shifting the phase of drop charging voltage of the ink jets of a continuous ink jet printer of the kind having: (i) an orifice plate comprising a linear orifice array for producing a plurality of ink jets, (ii) stimulation means for receiving a stimulation clock signal and imparting traveling wave vibration along the length of said orifice plate, (iii) a tachometer circuit for providing a signal having a frequency indicative of the movement of print medium past such ink jets; and (iv) a plurality of selectively addressable charge electrodes located adjacent the drop break-off region of such ink jets, said method comprising:

(a) producing a replicate signal of said stimulation clock signal;

(b) selectively shifting the phase of said replicate signal to provide a charge phase control signal;

(c) synchronizing said tachometer cirucit signal to said phase control signal to produce a print enable signal; and (d) controlling address of said charge electrodes with said print enable signal.

5. In a continuous ink jet printer of the kind having: (i) an orifice plate comprising a linear orifice array for producing a plurality of ink jets, (ii) stimulation means for imparting traveling wave vibration along the length of said orifice plate, and (iii) a plurality of selectively addressable charge electrodes located adjacent the drop break-off region of such ink jets, an improved control system for selectively shifting the location of drop charge defects incident to switching error, said system comprising:

(a) tachometer circuit means for providing a first pulse train signal having a frequency indicative of the movement of print medium past such ink jets;

(b) clock means for providing a second pulse train signal which has a fixed phase relationship to said stimulation;

(c) selectable synchronization circuit means for receiving said first pulse train signal and said second pulse train signal and producing a third pulse train signal which comprises pulses having a selectable phase shift relative to said second pulse train signal, and a frequency equal to the pulses of said first pulse train signal; and (d) gate means, for producing print pulses to said charge electrodes, in accord with information signals and in synchronization with said third pulse train signal.

6. In a continuous ink jet printer of the kind adapted to print on successive line regions of a print media at a print zone and having: (i) an orifice plate comprising an orifice array for producing a plurality of ink jets, (ii) stimulation means for imparting traveling wave vibration along the length of said orifice plate, and (iii) a plurality of selectively addressable charge electrodes located adjacent the drop break-off region of such ink jets, an improved drop charge control system comprising:

(a) first circuit means for producing a first signal having a frequency representing the velocity of print medium movement past said print zone;

(b) clock means for providing a stimulation signal to said stimulation means;

(c) charge synchronization circuit means for combining said first signal and said stimulation signal and outputting a phase shiftable enable signal having a phase of selectable phase shift relation to said stimulation signal and said first pulse train frequency; and (d) charge control circuit means for controlling energization of said electrodes in accord with information signals and with enable signals from said charge synchronization means.

* * * * *